(12) United States Patent
Cho et al.

(10) Patent No.: US 7,939,039 B2
(45) Date of Patent: May 10, 2011

(54) BIMETALLIC CATALYST FOR $NO_x$ REDUCTION IN ENGINE EXHAUST

(75) Inventors: Byong K. Cho, Rochester Hills, MI (US); Joon Hyun Baik, Pohang (KR)

(73) Assignee: GM Global Technology Operations LLC, Detroit, MI (US)

( * ) Notice: Subject to any disclaimer, the term of this patent is extended or adjusted under 35 U.S.C. 154(b) by 141 days.

(21) Appl. No.: 11/853,262

(22) Filed: Sep. 11, 2007

(65) Prior Publication Data

US 2009/0068093 A1    Mar. 12, 2009

(51) Int. Cl.
 *B01D 53/56*    (2006.01)
(52) U.S. Cl. .................... 423/239.2; 423/213.5
(58) Field of Classification Search ............... 423/239.2, 423/213.5
See application file for complete search history.

(56) References Cited

U.S. PATENT DOCUMENTS

| | | | |
|---|---|---|---|
| 5,041,272 A * | 8/1991 | Tamura et al. | 423/239.2 |
| 5,776,423 A * | 7/1998 | Feeley et al. | 423/239.2 |
| 6,171,556 B1 * | 1/2001 | Burk et al. | 422/173 |
| 6,455,463 B1 * | 9/2002 | Labarge et al. | 502/340 |
| 6,936,562 B2 | 8/2005 | Cho et al. | |
| 6,957,528 B1 | 10/2005 | Cho | |
| 7,090,811 B2 | 8/2006 | Cho et al. | |
| 7,093,429 B1 | 8/2006 | Cho | |
| 2005/0042159 A1 * | 2/2005 | Elomari | 423/239.2 |
| 2006/0113181 A1 | 6/2006 | Hirata et al. | |
| 2006/0228283 A1 * | 10/2006 | Malyala et al. | 423/239.1 |
| 2006/0283175 A1 | 12/2006 | Cho et al. | |
| 2007/0031310 A1 | 2/2007 | Lee et al. | |

FOREIGN PATENT DOCUMENTS

KR    1020070061589 A    6/2007

OTHER PUBLICATIONS

PCT International Search Report, International Application No. PCT/US2008/074985 filed Sep. 2, 2008; Applicant: GM Global Technology Operations, Inc.
PCT Written Opinion, International Application No. PCT/US2008/074985 filed Sep. 2, 2008; Applicant: GM Global Technology Operations, Inc.

* cited by examiner

*Primary Examiner* — Elizabeth D Wood
(74) *Attorney, Agent, or Firm* — Reising Ethington P.C.

(57) ABSTRACT

A catalyst made by the introduction of copper ions and cobalt ions into a Y-type zeolite to produce a CuCoY zeolite improves the reduction of NOx in exhaust from a lean burn engine, such as a diesel engine. A dual bed selective reduction reactor in the exhaust stream comprising a first bed of BaY or of Ag/alumina and a second bed of CuCoY is particularly effective in reduction of NOx. In one embodiment, the exhaust stream is suitably treated with an oxidant, such as ozone, and a reductant, such as a diesel hydrocarbon or oxygenated diesel hydrocarbon, before the exhaust passes in contact with the dual bed catalyst.

18 Claims, 10 Drawing Sheets

BIMETALLIC CATALYST FOR $NO_x$ REDUCTION IN ENGINE EXHAUST

TECHNICAL FIELD

This disclosure pertains to catalysts for use in NOx reduction in lean burn engine exhaust using hydrocarbon reductants. More specifically, this disclosure pertains to the use of new bimetallic catalysts in such an application.

BACKGROUND OF THE INVENTION

Diesel engines and other lean-burn engines or power plants are operated at higher than stoichiometric air-to-fuel mass ratios for improved fuel economy. Such lean-burning engines produce a hot exhaust with a relatively high content of oxygen and nitrogen oxides ($NO_x$). The temperature of the exhaust from a warmed-up diesel engine is typically in the range of 200° C. to 400° C. and has a representative composition, by volume, of about 10-17% oxygen, 3% carbon dioxide, 0.1% carbon monoxide, 180 ppm hydrocarbons, 235 ppm $NO_x$ and the balance nitrogen and water. These $NO_x$ gases, typically comprising nitric oxide (NO) and nitrogen dioxide ($NO_2$), are difficult to reduce to nitrogen ($N_2$) because of the high oxygen ($O_2$) content in the hot exhaust stream.

U.S. Pat. Nos. 6,957,528 and 7,093,429, and U.S. Patent Application Publication 2006/0283175, each assigned to the same assignee as this invention, disclose methods of adding ozone and nonthermal plasma-reformed diesel fuel constituents to the exhaust stream flowing from a lean burn engine or power plant preparatory to selective catalytic reduction (SCR) of NOx. Ozone is added to the exhaust stream for oxidation of NO to $NO_2$. And air/ozone plasma-generated, low molecular weight, oxygenated hydrocarbons and hydrocarbons from a fractionated portion of the diesel fuel hydrocarbon mixture are added to the exhaust as reductants for conversion of $NO_2$ to $N_2$ over a selective reduction catalyst. This process may be called diesel fuel/SCR. Cu/Y zeolite and Ag/alumina catalysts have been considered for use in SCR. However, there remains a need for improvement in the conversion of NOx in diesel exhaust and in the exhaust of other lean burn engines.

SUMMARY OF THE INVENTION

In accordance with an embodiment of the invention a lean-burn engine exhaust stream, often at a temperature in the range of about 200° C. to about 400° C. and typically containing NO and $NO_2$, is treated to prepare the hot, oxygen-containing stream for selective catalytic reduction of the mixture of nitrogen oxides. In general, it is useful to promote the oxidation of nitrogen oxide (NO) to nitrogen dioxide ($NO_2$) and to add hydrocarbon and oxygenated hydrocarbon constituents to the exhaust as reductants for conversion of $NO_2$ to $N_2$. For example, a stream of ozone produced in ambient air plasma may be added to the exhaust gas to promote oxidation of NO, and relatively low molecular weight diesel fuel hydrocarbons (e.g., propane to dodecane) and oxygenated diesel fuel hydrocarbons (e.g., ethanol) may be added downstream of the ozone addition for reaction with $NO_2$ over a selective reduction catalyst in an exhaust reactor. The SCR stream is then discharged to the atmosphere with lower NOx content.

New bimetallic catalyst formulations are provided for improved NOx reduction of lean burn engine exhaust. In preferred embodiments of the invention these bimetallic catalysts are used to treat exhaust in which diesel fuel hydrocarbons have been added as reductants (HC/SCR). Different embodiments of catalyst formulations for the HC/SCR are provided. In one embodiment, a dual-bed catalytic reactor is used comprising Ba-substituted, Y-type zeolite (sometimes designated BaY herein for brevity) in the front bed and Cu and Co substituted Y-type zeolite in the rear bed (CuCoY). In a second embodiment, a dual bed selective catalytic reactor comprises Ag/alumina catalyst in the front bed and CuCoY in the rear bed.

Y-type zeolites are a family of alumina-silicates exhibiting the crystal structure of the mineral, faujasite. They have a three-dimensional pore structure. Sodium ion-substituted Y-type zeolites (sometimes designated simply as NaY) are commercially available. Some or all of the sodium ions may be substituted (by ion exchange) with other ions. In some embodiments of this invention, barium ion exchanged-Y zeolites, BaY, may be used in one bed of the dual bed SCR reactor and copper ion exchanged and cobalt ion exchanged-Y zeolites, CuCoY, may be used in a bed of the dual bed SCR reactor.

Dual bed reactors comprising an upstream catalyst bed of particles of alumina-supported silver, or particles of BaY, and a downstream bed of particles of a suitable CuCoY composition are effective in the selective catalytic reduction of a major portion of the NOx content of the exhaust stream from a diesel engine or other hydrocarbon-fueled engine producing NOx in an oxygen-rich exhaust stream.

Other embodiments and advantages of the invention will be apparent from the following illustrative examples. In describing these illustrative embodiments of the invention, reference will be made to drawings or graphs described in the next section of this specification.

DESCRIPTION OF ILLUSTRATIVE EMBODIMENTS

Figure 1:
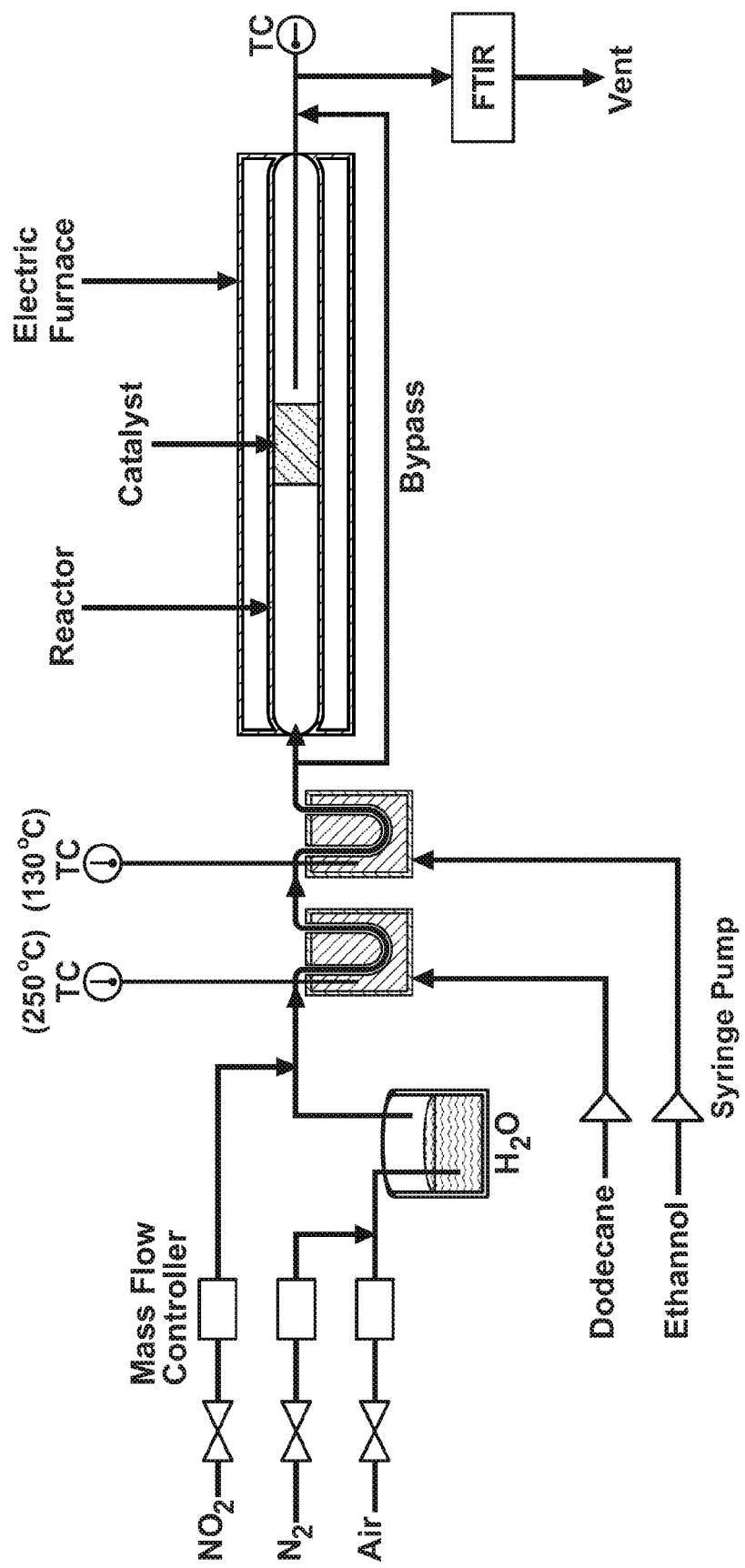
FIG. 1 is a schematic flow diagram of a simulated diesel exhaust composition stream flowing through a dual bed reactor for reduction of NOx to nitrogen. In the gas flow system, dodecane is added as an illustrative hydrocarbon fuel reductant and ethanol as a representative oxygenated hydrocarbon fuel reductant. Combinations of selective reduction catalysts, including bimetal catalysts in accordance with embodiments of this disclosure, are used in a flow-through tubular electric furnace containing catalyst beds as a dual bed reactor.

The exhaust from a diesel engine often contains carbon particulates, unburned hydrocarbons (HC), and carbon monoxide in addition to NOx constituents. The exhaust may be treated to remove or burn the particulates and/or to oxidize HC and carbon monoxide to carbon dioxide before the exhaust is treated to chemically reduce NOx content to nitrogen.

The NOx-containing exhaust from an engine is further prepared for selective catalytic reduction of nitrogen oxides. Ozone may be added to the exhaust to promote the oxidation of NO to $NO_2$. In some embodiments of the invention the ozone is formed by passing a stream of ambient air through a suitable nonthermal plasma generator and a plasma stream of air, ozone, and other oxygen-containing species added to the exhaust. Then a hydrocarbon reductant is added to the exhaust. Such hydrocarbon(s) may be fractionated from diesel fuel drawn from on-board storage and contained in a suitable processing container or vessel. Ambient air may be bubbled up through the hydrocarbon fuel to strip lower molecular weight hydrocarbons from the diesel fuel (or other hydrocarbon-containing fuel). In practices of the invention the term diesel fuel hydrocarbons may include hydrocarbons that have been oxygenated, such as ethanol. Such hydrocarbons and oxygenated hydrocarbons may be produced using a stream of ambient air first passed through a non-thermal plasma reactor to produce a mixture of ozone, air, and possibly other oxygen species, and the ozone-containing stream passed through the fuel to strip hydrocarbons and to produce some oxygenated hydrocarbons. The exhaust now contains $NO_2$ and hydrocarbons. The carbon content of the reformed fuel may be normalized in terms of molar methane ($C_1$). In general, the requirement for reformed diesel fuel constituents increases with increased NOx content in the exhaust and increased exhaust temperature (catalytic reactor temperature). For example, about eight moles of reformed hydrocarbon (normalized as $C_1$) may be required per mole of normalized NOx at a catalyst temperature of 200° C. for efficient NOx removal. The required amount of ozone decreases with an increase of the catalyst temperature. Thus, the ozone requirement is greatest at catalytic reactor temperatures of about 150-200° C. and decreases to zero at reactor temperatures of 350-400° C.

In accordance with an embodiment of the invention, new bimetallic catalyst formulations are provided for improved NOx reduction in a lean burn engine exhaust stream.

The new catalyst material comprises formulations of copper ion-exchanged and cobalt ion-exchanged Y zeolites. Application of this catalyst for the HC/SCR is illustrated in this specification in two different ways: First, using a catalytic reactor made of a dual-bed catalyst containing BaY in the front bed and CuCoY in the rear bed, and second, using a dual-bed catalyst containing Ag/alumina in the front bed and CuCoY in the rear bed.

In the following illustrations, which include many comparative reactions, BaY and KY catalysts were prepared from NaY with a Si/Al ratio of 2.6 obtained from Zeolyst Inc. (CBV100) by a standard ion-exchange process using aqueous solutions of $Ba(NO_3)_2$ and $KNO_3$ as precursors, respectively. The ion exchange process was repeated three times for BaY and twice for KY, followed by drying at 100° C. overnight and calcining in air at 500° C. for 5 h.

Both CuY and CuCoY catalysts were also prepared from NaY obtained from Zeolyst Inc. (CBV100) by a standard sequential ion-exchange process—Cu ion exchange first, followed by Co ion exchange—using aqueous solutions of $Cu(NO_3)_2$ and $Co(NO_3)_2$ as precursors. In each ion-exchange step to prepare the CuCoY catalyst, 0.01 M of each metal precursor was first dissolved in 1 L of deionized water, and then 10 gram of NaY zeolite was added for the metal-ion exchange. The ion exchange process for Cu was repeated up to 3 times in order to obtain the optimum exchange level, while the Co exchange process was done only once for all samples. The ion-exchanged CuCoY catalysts were dried at 100° C. overnight, followed by calcination at 500° C. for 5 h.

The Ag/alumina catalyst containing 2 wt. % Ag was prepared on γ-alumina powder obtained from Sasol (Catalox SBA-200) by the incipient wetness method using $AgNO_3$ as the precursor. The impregnated Ag/alumina catalyst powder was dried at 110° C. overnight followed by calcination in air at 500° C. for 10 h. The calcined catalyst powder samples were compressed under 10 ton pressure to form a wafer. After annealing at 500° C. for 20 h under atmospheric conditions, the wafer was crushed and screened to 20-40 mesh sizes before being packed into the reactor.

Prior to activity measurements, the packed-bed reactor was pretreated at 500° C. for 1 h under the standard reaction conditions as listed in Table 2.

Figure 2:
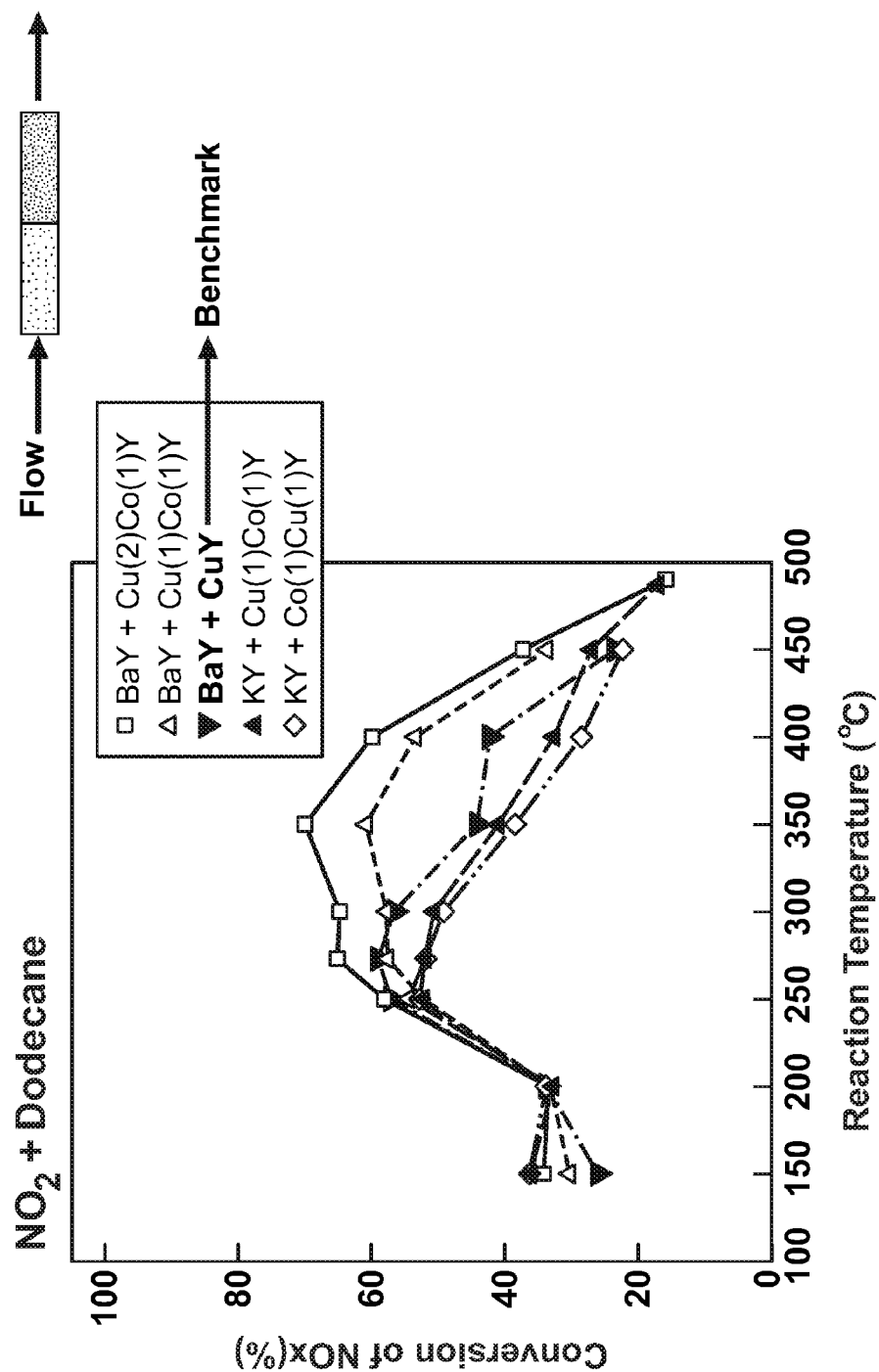
FIG. 2 is a graph of percent conversion of NOx in a lean exhaust environment versus reaction temperature (° C.) for different catalyst formulations for a dual bed reactor using dodecane as a reductant in the simulated diesel exhaust. In these tests the dual bed reactor contained BaY or KY in the front bed and CuY, CuCoY, or CoCuY in the rear bed.
Figure 10:
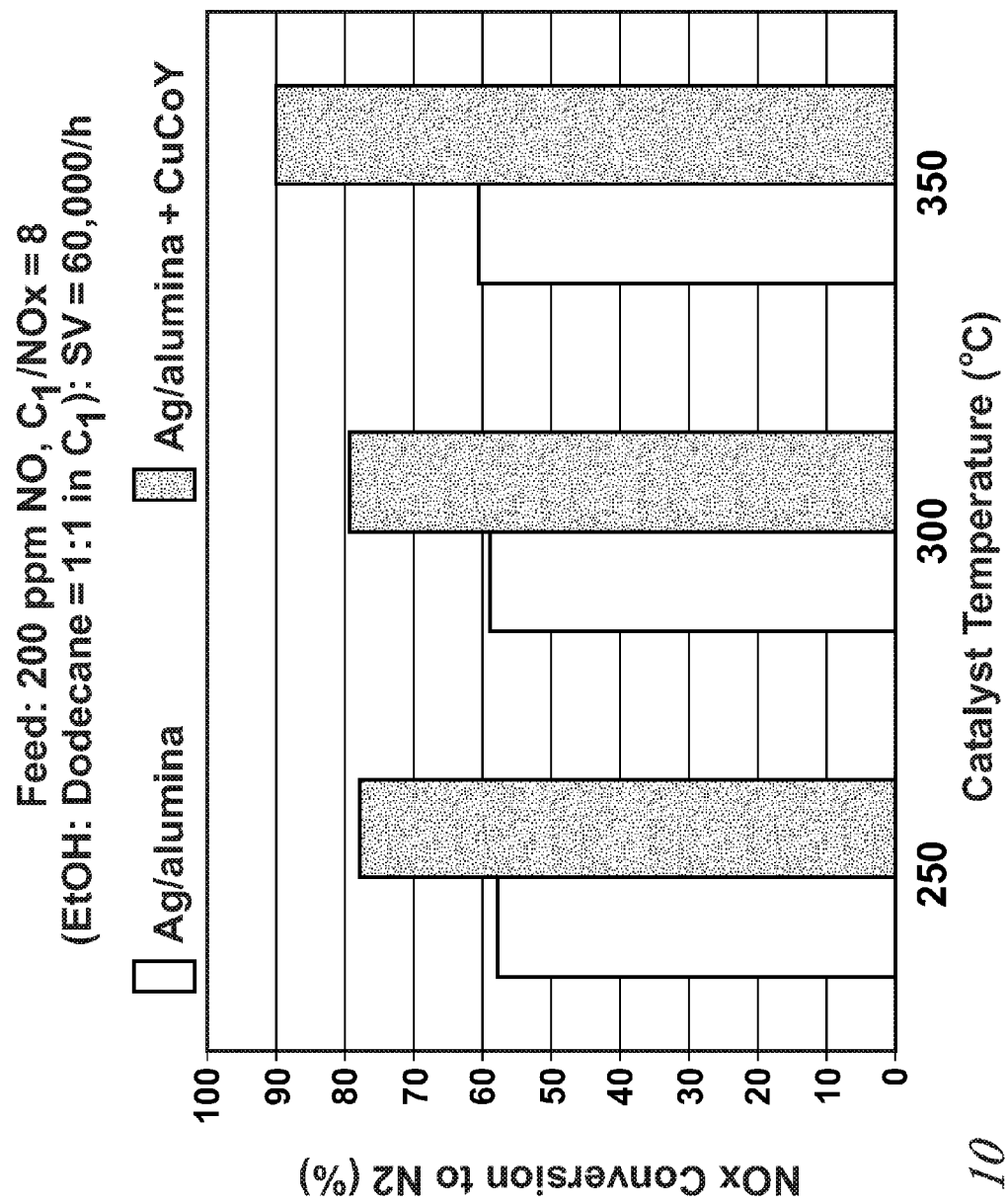
FIG. 10 is a bar graph comparing NOx conversion to $N_2$ (%) versus catalyst temperature (250° C., 300° C., 350° C.) of a feed stream of 200 ppm NO, with a $C_1$/NOx=8 (ethanol: dodecane=1.1 in $C_1$) and at a space velocity of 60,000/h over a single bed catalyst of Ag/alumina (bar data) and over a dual bed catalyst of Ag/alumina (front bed)+CuCoY (rear bed)

Improvement of NOx reduction performance by an average NOx conversion of 15% was achieved using a new catalyst formulation (BaY+CuCoY) in lab reactor experiments over a wide temperature range of 250-450° C. using simulated diesel engine exhaust compositions, compared with the benchmark (BaY+CuY) catalyst (FIG. 2). When the new bimetallic catalyst (CuCoY) was used in combination with the conventional Ag/alumina catalyst in a dual-bed mode (Ag/alumina+CuCoY), improvements in NOx conversion of 20-30% were achieved over the temperature range of 250-350° C. (FIG. 10).

Listed in Table 1 are metal contents contained in the new catalyst formulations prepared and tested in this work, where the notation of M1(i)M2(j)Y indicates that M1, M2 are is the first and second metal ions, respectively, exchanged sequentially onto the NaY-zeolite substrate. The numbers i and j in the parenthesis indicate the number of repetitions during the ion exchange processes for M1 and M2, respectively. For example, Cu(3)Co(1)Y denotes that the Cu-ion was first exchanged onto the NaY zeolite via three repeated ion-exchange processes followed by the Co-ion exchange.

TABLE 1

| Catalysts | Metal Content (wt. %) | | | | | |
|---|---|---|---|---|---|---|
| | Ba | K | Cu | Co | Na | Ag |
| Ba(3)Y | 6-10 | | | | | |
| K(2)Y | | 8 | | | <0.5 | |
| Cu(2)Y | | | 7.3 | | | |
| Ag/alumina | | | | | | 2.0 |
| Co(1)Cu(1)Y | | | 3.0 | 2.1 | 2.2 | |
| Cu(1)Co(1)Y | | | 3.2 | 2.6 | 1.7 | |
| Cu(2)Co(1)Y | | | 5 | 1.7 | 1.5 | |
| Cu(3)Co(1)Y | | | 6 | 1.7 | 1.2 | |

Listed in Table 2 are the experimental conditions used to demonstrate the NOx conversion performance of the new catalysts in the lab reactor experiments.

TABLE 2

Standard Experimental Conditions

| | |
|---|---|
| Benchmark catalysts: | single-bed catalyst (Ag/alumina); dual-bed catalyst (BaY + CuY). |
| Catalyst bed configurations: | dual-bed catalysts (BaY + CuCoY) & (Ag/alumina + CuCoY); physical mixture catalyst (BaY – CuCoY). |
| Catalyst temperature: | 150-500° C. |
| Catalyst powder: | 20/40 mesh |
| Total flow rate: | 200 cc/min |
| Reactor space velocity: | 30,000-60,000 h−1 |
| Feed gas composition: | 200 ppm NO or $NO_2$, 6% $O_2$, 2.5% $H_2O$, balance $N_2$ $C_1/N = 8$, composed of 133 ppm Dodecane, or 67 ppm Dodecane + 400 ppm Ethanol [D/E = 1 on $C_1$ basis] |

FIG. 1 shows the schematic flow diagram of the laboratory reactor system used to evaluate the NOx reduction performance of various catalysts in the Diesel/SCR process where simulated diesel fuel was used as the reductant. Catalytic activity was measured between 150 and 500° C. in a packed-bed flow reactor at atmospheric pressure. The feed reactant flow to the catalyst contained 200 ppm $NO_2$, 6% $O_2$, 2.5% $H_2O$, 133 ppm dodecane (or a mixture of 67 ppm dodecane and 400 ppm ethanol) and balance $N_2$. Note that either dodecane alone or the mixture of dodecane and ethanol maintains the carbon/NOx feed ratio of 8. Here dodecane was used as a representative diesel fuel hydrocarbon, while the mixture of dodecane and ethanol was used as a representative mixture of diesel fuel hydrocarbon and an oxygenated hydrocarbon. Both the feed and the product composition to and from the catalytic reactor were analyzed by an FTIR.

FIG. 2 compares the NOx conversion performances of different catalyst formulations for a dual-bed reactor containing BaY or KY in the front bed and CuY, CuCoY or CoCuY in the rear bed, when dodecane was used as the reductant for $NO_2$ reduction. The (BaY+CuY) dual-bed catalyst was used as the benchmark catalyst, since its good activity has been demonstrated previously in a plasma-catalyst system for NOx reduction (see U.S. Pat. No. 7,090,811). The NOx conversion activity of the (KY+CuCoY) catalyst is better than that of the (KY+CoCuY) catalyst, indicating that the order of ion exchange with the first Cu-ion exchange followed by the Co ion exchange is preferable to the reverse order. Note that both of these two catalysts with KY in the front bed are not as good as the bench mark (BaY+CuY) catalyst in terms of their NOx conversion performance. On the other hand, the [BaY+Cu(1)Co(1)Y] and [BaY+Cu(2)Co(1)Y] catalysts show better NOx conversion performance than the benchmark catalyst over the catalyst temperature range of 150-450° C. Particularly noteworthy is the fact that the NOx conversion activity of the latter catalyst which was ion-exchanged twice with Cu is better than that of the former which was ion-exchanged only once with Cu, indicating that the multiple ion-exchange is preferable for the Cu-ion exchange. In a series of more experiments, it was revealed that more than two repetitions of the Cu-ion exchange process and more than a single ion exchange of Co did not make any further improvement in the NOx conversion performance of the catalysts. The data in FIG. 2 clearly demonstrate that BaY is preferable to KY in the front bed, while CuCoY is preferable to CuY in the rear bed in a dual-bed catalyst system. Among those new catalyst formulations developed in this work, the [BaY+Cu(2)Co(1)Y] dual-bed catalyst proved to be the best and its performance for NOx reduction was essentially the same as that of [BaY+Cu(3)Co(1)Y].

Figure 3A:
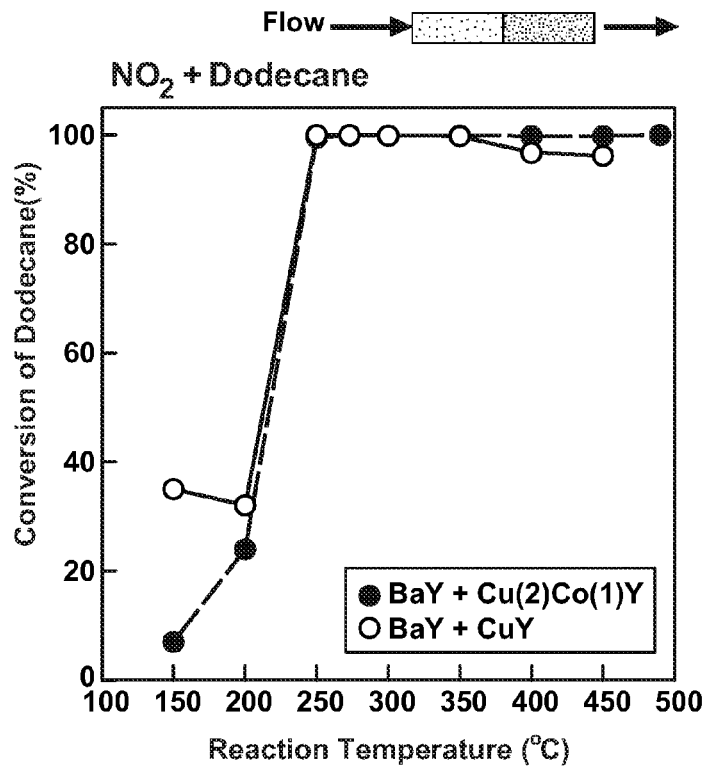
FIG. 3A is a graph comparing the percent conversion of dodecane versus reaction temperature (° C.) in simulated exhaust streams containing dodecane and $NO_2$ using BaY+Cu(2)Co(1)Y (filled circle data points) or BaY+CuY (unfilled circle data points) as a reduction catalyst.
Figure 3B:
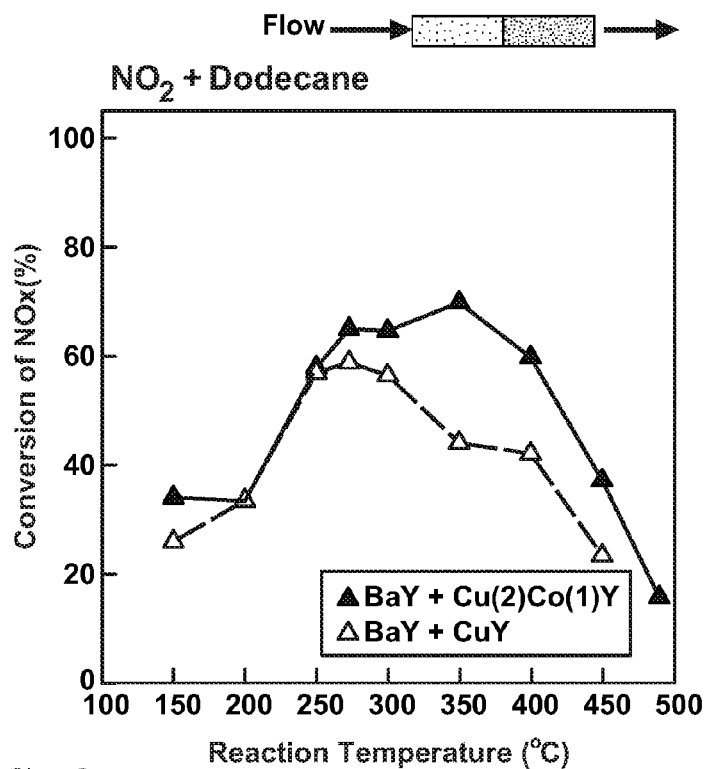
FIG. 3B is a graph presenting the percent conversion of NOx versus reaction temperature (° C.) in the same exhaust streams.

FIG. 3 compares a new catalyst formulation and the benchmark catalyst formulation for the conversion of both HC and NOx when dodecane was used as the reductant for $NO_2$ reduction. Above 250° C., it is interesting to see that the NOx conversion performance of the new catalyst formulation containing the bimetallic CuCoY catalyst in the rear bed is much better (about 15% improvement) than that of the benchmark catalyst containing CuY catalyst in the rear bed, even though the HC conversion performance is essentially the same for both catalysts. Below 200° C., the new catalyst formulation is better than the benchmark catalyst for the NOx conversion, whereas this trend reverses for the HC conversion. Both findings put together, it is obvious that the hydrocarbon reductant (dodecane in this case) is more efficiently utilized for NOx reduction over the new catalyst (BaY+CuCoY) than over the benchmark catalyst (BaY+CuY).

Figure 4A:
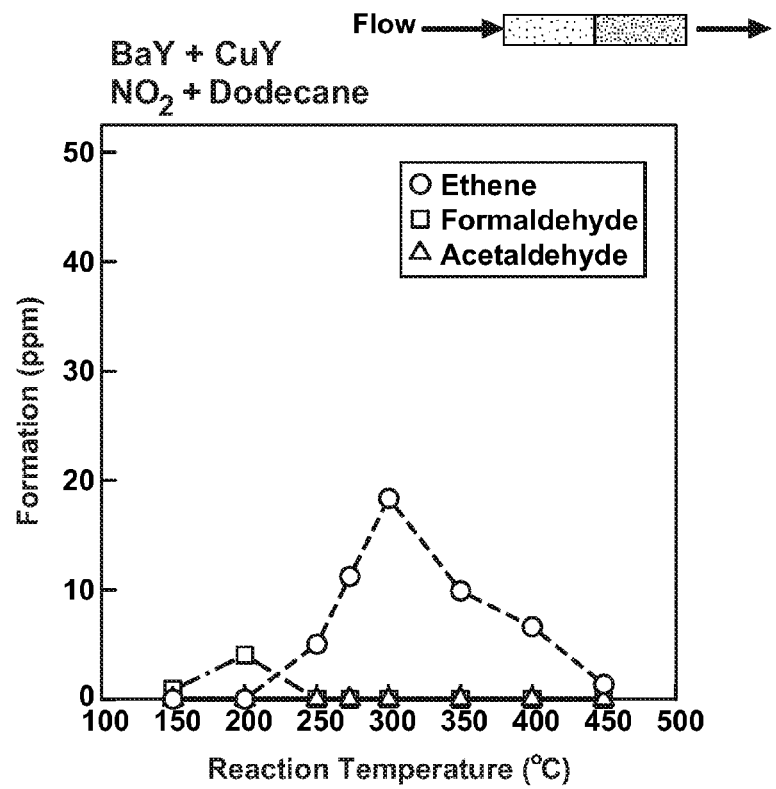
FIG. 4 is a pair of graphs comparing the formation of carbon-containing byproducts (ethene-unfilled circles, formaldehyde-unfilled squares, and acetaldehyde-unfilled triangles) versus reaction temperature (° C.) in a simulated diesel exhaust stream comprising $NO_2$ and dodecane using a dual bed reactor of BaY+CuY (FIG. 4A) and BaY+Cu(2)Co(1)Y (FIG. 4B).
Figure 4B:
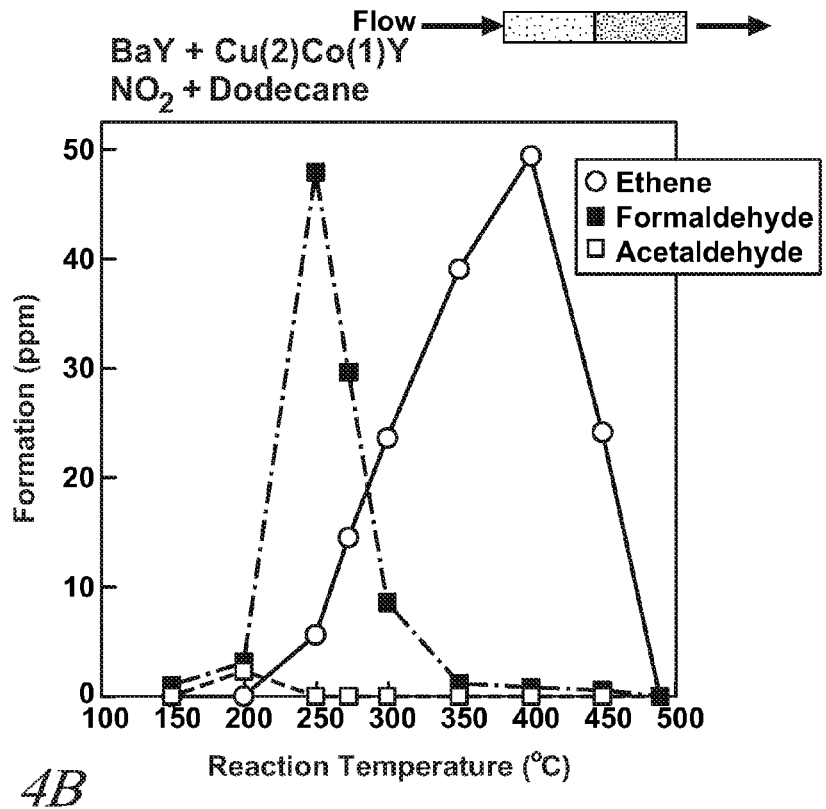

FIG. 4 compares the formation of carbon-containing byproducts in the dual-bed catalyst containing the [BaY+Cu(2)Co(1)Y] catalysts with that in the benchmark (BaY+CuY) catalyst, when dodecane was used as the reductant for $NO_2$ reduction. It reveals that the new catalyst containing the bimetallic CuCoY catalyst produces more reaction intermediates such as ethene ($C_2H_4$, ethylene) and aldehydes than the benchmark catalyst, which are known to be effective reductants for NOx reduction over base metal catalysts such as Cu and Co. This may explain why the new catalyst formulation is more effective for NOx conversion than the benchmark catalyst formulation, as shown in FIG. 3.

Figure 5A:
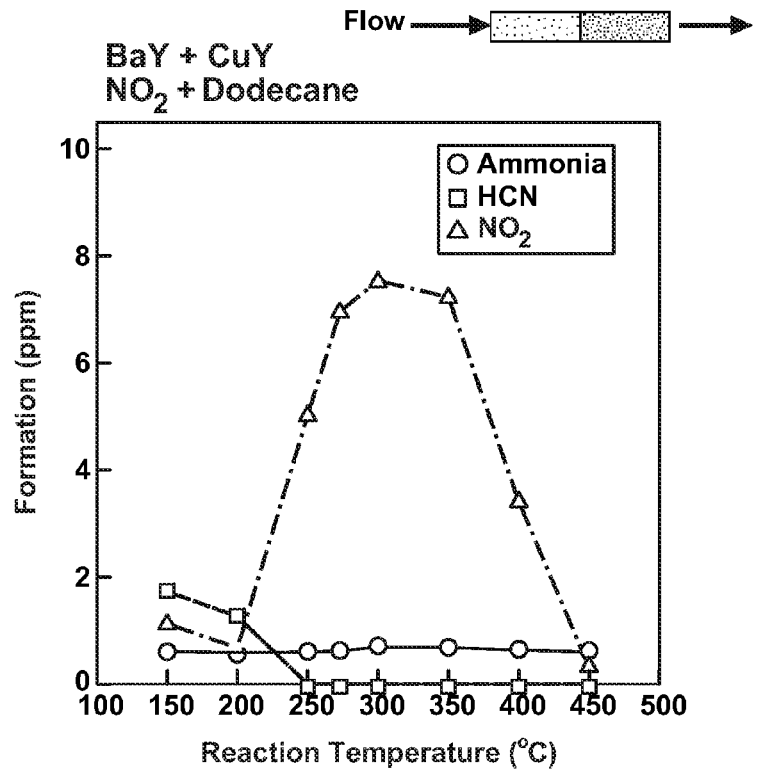
FIG. 5 is a pair of graphs comparing the formation of nitrogen-containing byproducts (ammonia-unfilled circles, HCN-unfilled squares, and $N_2O$-unfilled triangles) versus reaction temperature (° C.) in a stream comprising $NO_2$ and dodecane using a dual bed reactor of BaY+CuY (FIG. 5A) and BaY+Cu(2)Co(1)Y (FIG. 5B).
Figure 5B:
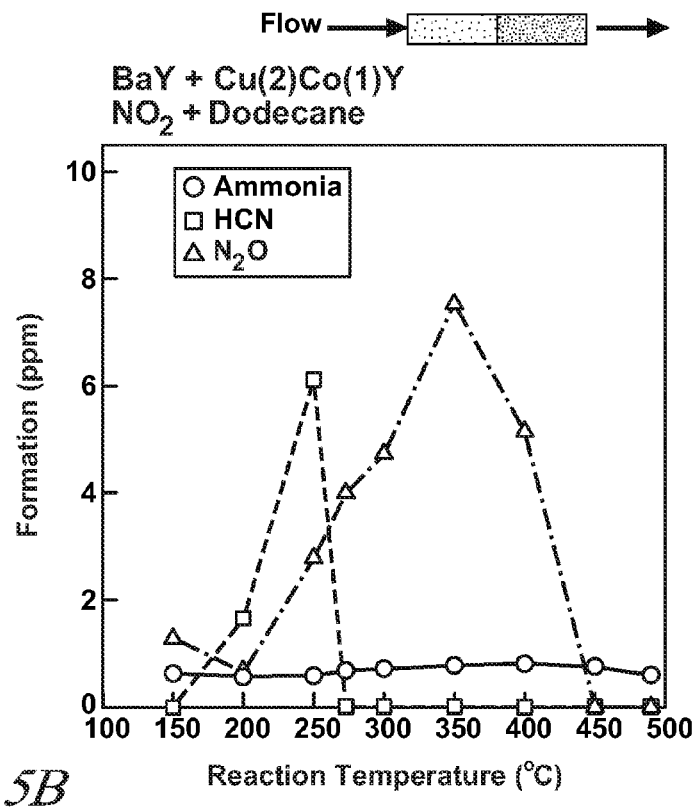

FIG. 5 compares N-containing byproducts produced during the NOx reduction process over the new catalyst (BaY+CuCoY) and the benchmark catalyst (BaY+CuY), when dodecane was used as the reductant for $NO_2$ reduction. It is clear that the new catalyst formulation promotes the formation of HCN compared to the benchmark catalyst, while $N_2O$ formation is slightly shifted to higher temperatures. For both catalysts, $NH_3$ formation is negligible. In light of the data in FIGS. 3 and 5 it can be concluded that the new dual-bed (BaY+CuCoY) catalyst improves the NOx conversion performance by about 15% over the catalyst temperature range of 250-450° C. compared to the benchmark (BaY+CuY) catalyst while producing more HCN, when dodecane was used as the NOx reductant.

Figure 6A:
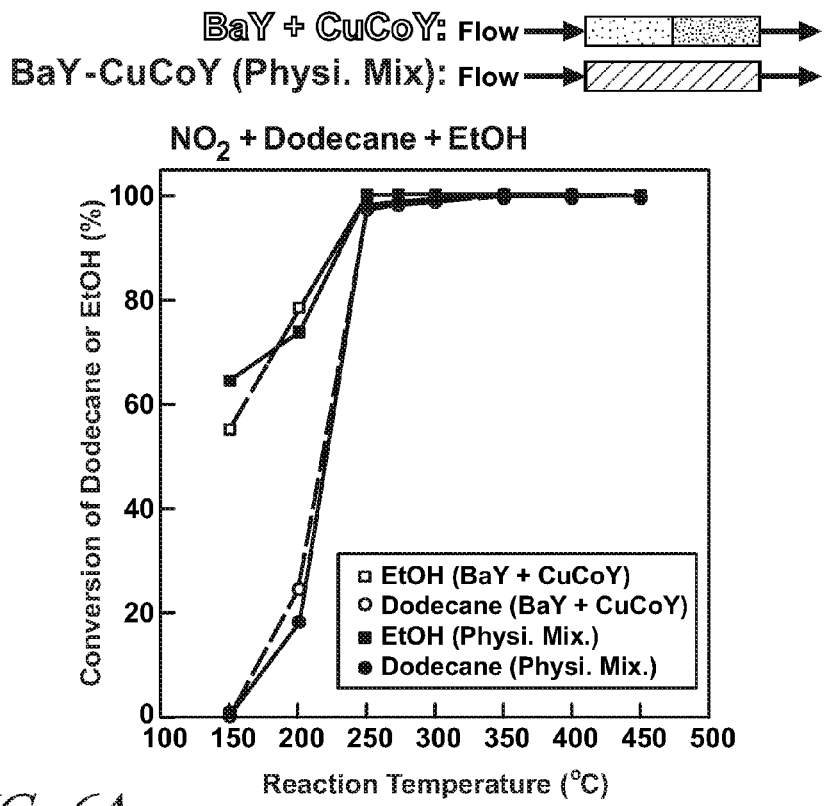
FIG. 6 is a pair of graphs comparing the percent conversion of dodecane or ethanol (FIG. 6A) versus reaction temperature (° C.) in streams of $NO_2$+dodecane+ethanol in the dual-bed reduction reactor of BaY+CuCoY or in a reduction reactor using a single bed containing a physical mixture of BaY and CuCoY.
FIG. 6B compares the conversion of NOx versus reaction temperature (° C.) in the same feed streams.
Figure 6B:
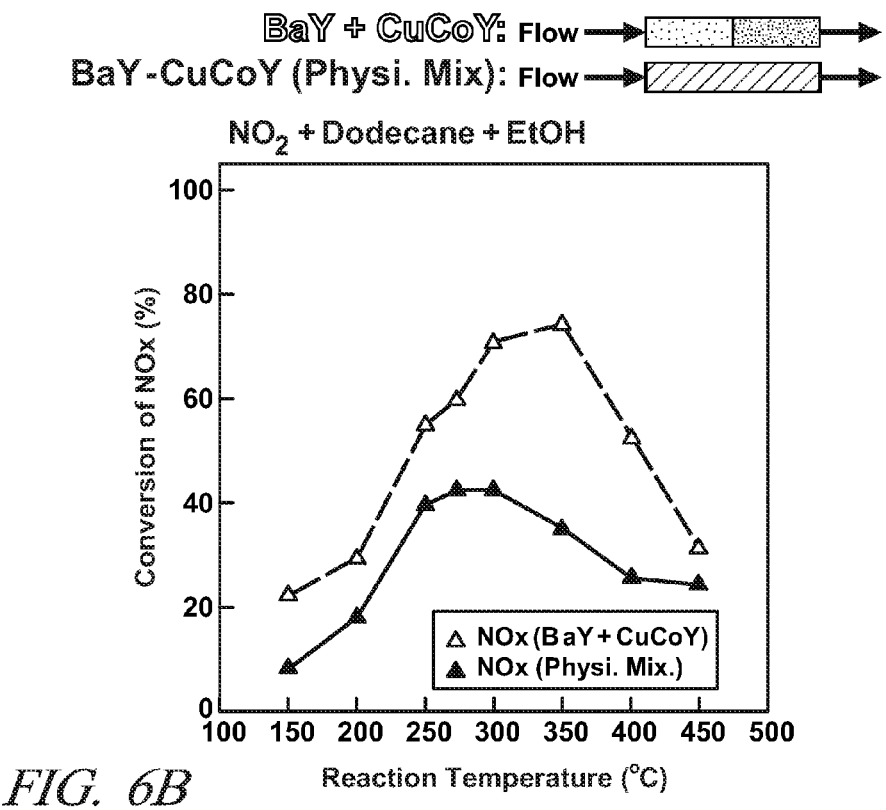

It has been shown that diesel fuel can be reformed by treating with air plasma to produce oxygenated hydrocarbons (OHC's) such as ethanol. In order to simulate the reformed diesel fuel, ethanol was added to dodecane to make a gaseous mixture of 67 ppm dodecane and 400 ppm ethanol while maintaining the $C_1$/NOx feed ratio at 8. FIG. 6 shows the effect of catalyst bed configuration when a mixture of dodecane and ethanol was used as the reductant for the new catalyst formulation. One configuration is the dual-bed [BaY+Cu(3)Co(1)Y] designated as BaY+CuCoY, and the other is a uniform physical mixture of BaY and Cu(3)Co(1)Y designated as BaY—CuCoY. As shown in FIG. 6A, ethanol conversion is much higher than dodecane conversion, and both conversions are essentially the same for both catalyst configurations. FIG. 6B shows that the NOx conversion over the dual-bed configuration is much better than that over the physical mixture, even though the hydrocarbon reductant conversions are the same for both catalysts as shown in FIG. 6A.

Figure 7A:
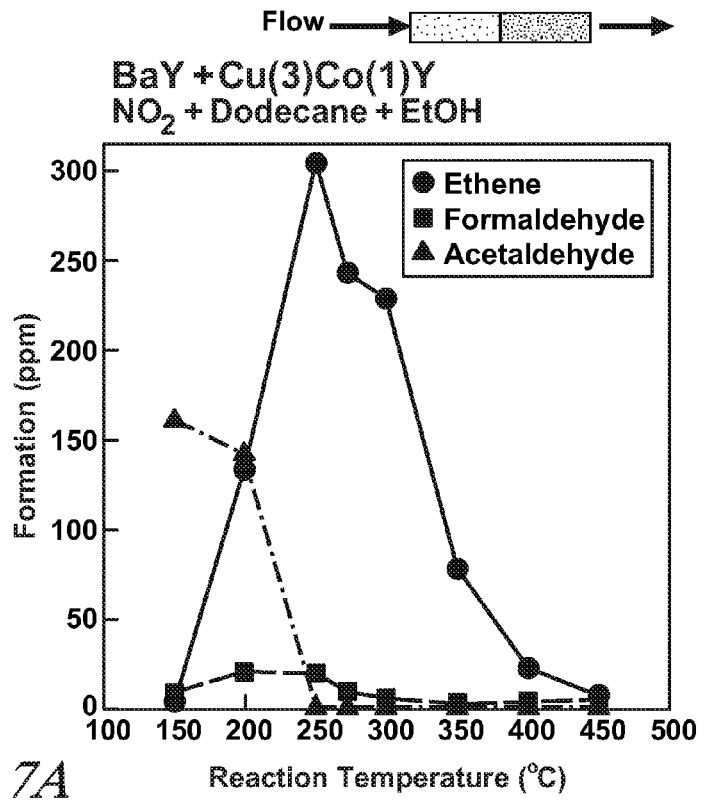
FIG. 7 is a pair of graphs comparing the formation (in ppm) of ethene-filled circles, formaldehyde-filled squares, and acetaldehyde-filled triangles versus reaction temperature (° C.) in streams of $NO_2$+dodecane+ethanol in a dual-bed reduction reactor of BaY+CuCoY (FIG. 7A) and in a reduction reactor using a single bed containing a physical mixture BaY and CuCoY (FIG. 7B).
Figure 7B:
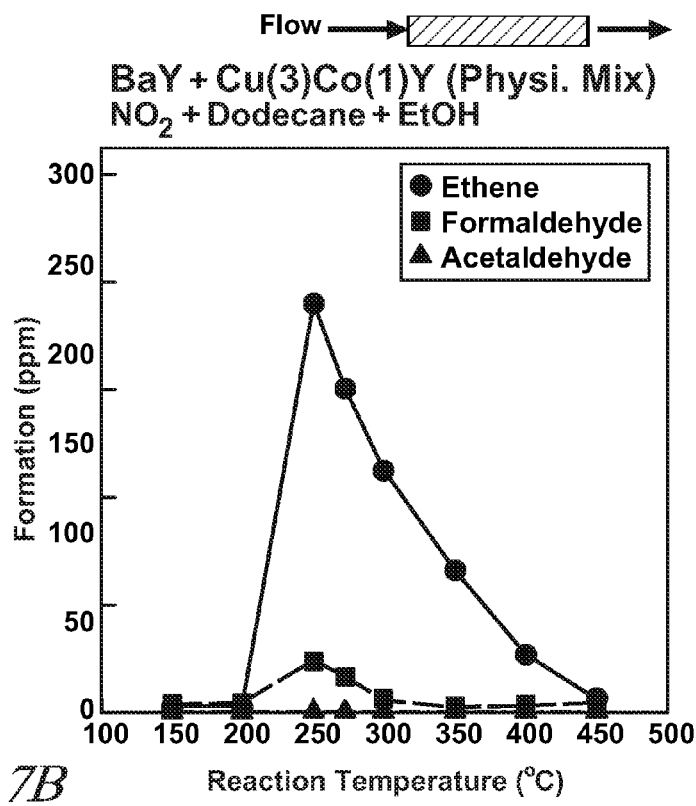

FIG. 7 compares the formation of carbon-containing byproducts in the dual-bed catalyst configuration containing the [BaY+Cu(3)Co(1)Y] catalysts with that in the physical mixture, when a mixture of dodecane and ethanol was used as the NOx reductant. It shows that the dual-bed configuration produces much more reaction intermediates such as ethene and aldehydes than the physical mixture. Note that those hydrocarbon intermediates are known to be effective reductants for NOx reduction over base metal catalysts such as Cu and Co. This may explain why the dual-bed configuration is much more effective for NOx conversion than the physical mixture, as shown in FIG. 6.

Figure 8A:
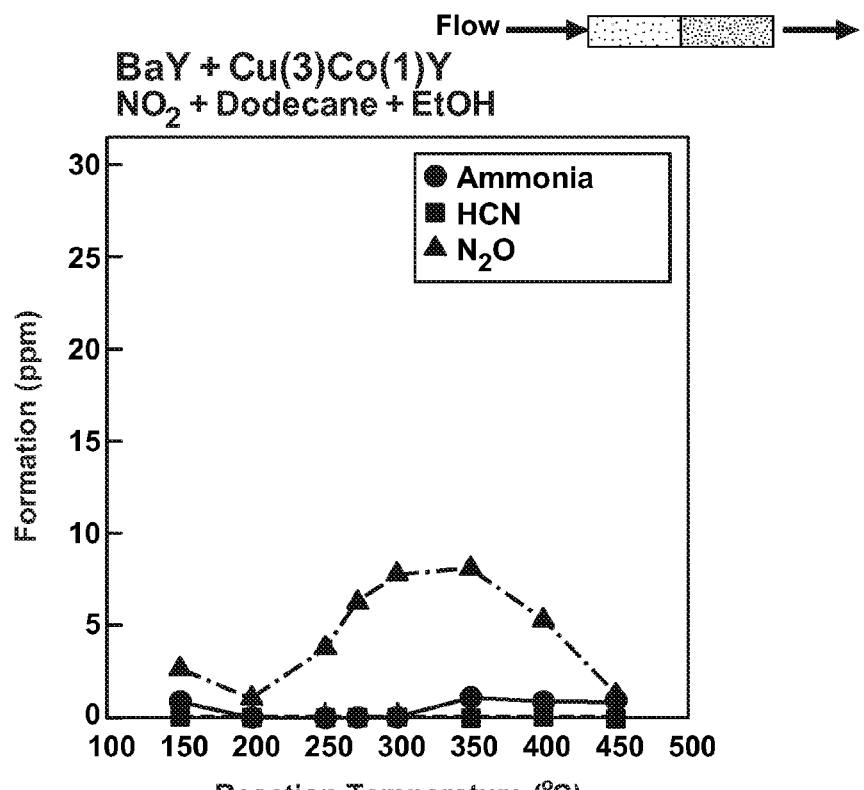
FIG. 8 is a pair of graphs comparing the formation (in ppm) of ammonia-filled circles, HCN-filled squares, and $N_2O$-filled triangles versus reaction temperature (° C.) in streams of $NO_2$+dodecane+ethanol in a dual-bed reduction reactor of BaY+CuCoY (FIG. 8A) and in a reduction reactor using a single bed containing a physical mixture BaY and CuCoY (FIG. 8B).
Figure 8B:
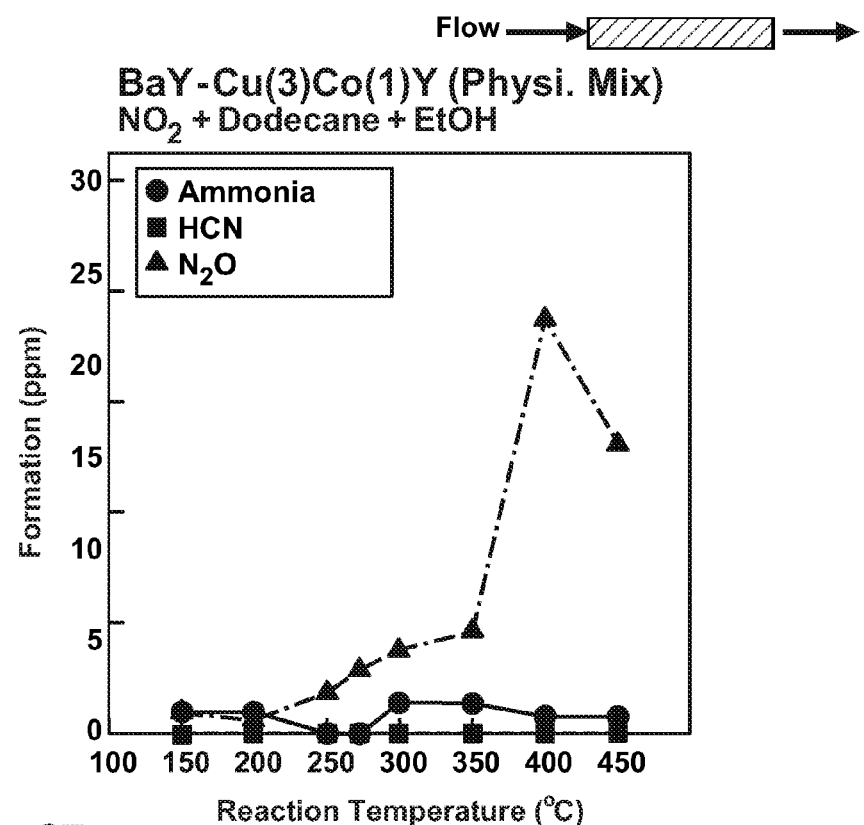

FIG. 8 compares N-containing byproducts produced during the NOx reduction process over the dual-bed configuration and the physical mixture, when a mixture of dodecane and ethanol was used as the NOx reductant. It shows that the amount of N-containing byproduct formation depends strongly on catalyst temperature for both configurations. However, the dual-bed configuration reduces the total amount of undesirable N-containing byproducts formation such as ammonia and $N_2O$ compared with the physical mixture over the catalyst temperature range of 150-450° C., while HCN formation is negligible for both configurations. Comparison of FIG. 5b with FIG. 8a indicates that the use of a mixture of ethanol and dodecane as the reductant greatly reduces the formation of undesirable N-containing byproducts such as $N_2O$ and HCN over the (BaY+CuCoY) catalyst, compared with the use of dodecane as the reductant. In light of the data in FIGS. 6 and 8 it is concluded that the dual-bed configuration is preferable to the physical mixture of the BaY and CuCoY catalysts for NOx reduction using a mixture of hydrocarbon and alcohol as the NOx reductant.

The enhanced NOx reduction activity of the dual-bed (BaY+CuCoY) catalyst compared with that of the benchmark (BaY+CuY) catalyst may be explained by the synergistic catalytic effect caused by electron transfer between Cu and Co. It is well established that the active catalytic sites of Cu and Co for NOx reduction are $Cu^{2+}$ and $Co^{2+}$ sites. The redox potential of $Cu^{1+}/Cu^{2+}$ is 0.15V, while that of $Co^{2+}/Co^{3+}$ is 1.82V. This means Co has a stronger affinity for an electron than Cu, which results in electron transfer from Cu to Co. That is, $Cu^{1+}$ donates an electron to become $Cu^{2+}$, while $Co^{3+}$ accepts an electron to become $Co^{2+}$. Thus, $Cu^{1+}$ acts as an electron donor, while $Co^{3+}$ acts as an electron acceptor. This way, $Cu^{2+}$ helps to stabilize $Co^{2+}$, leading to the synergistic catalytic effect for NOx reduction on the catalytically active $Cu^{2+}$ and $Co^{2+}$ sites The dual-bed catalysts containing the BaY catalyst in the front bed and the bimetallic CuCoY catalyst in the rear bed disclosed in this invention is suitable for an engine exhaust stream that contains $NO_2$ as the major NOx species. (Note that NOx refers to both NO and $NO_2$.) Since the major NOx species in a typical lean-burn engine exhaust gas such as diesel engine exhaust is not $NO_2$ but NO, an oxidation catalyst or a plasma reactor may be used in practice to convert NO to $NO_2$ in the exhaust. It is also important to note that a mixture of hydrocarbons and oxygenated hydrocarbons such as alcohols can be produced from raw diesel fuel using a fuel reformer assisted by air plasma [Cho, U.S. Pat. No. 6,957,528-B1, U.S. Pat. No. 7,093,429; Cho and Olson, U.S. Patent Application Publication 2006/0283175].

Figure 9A:
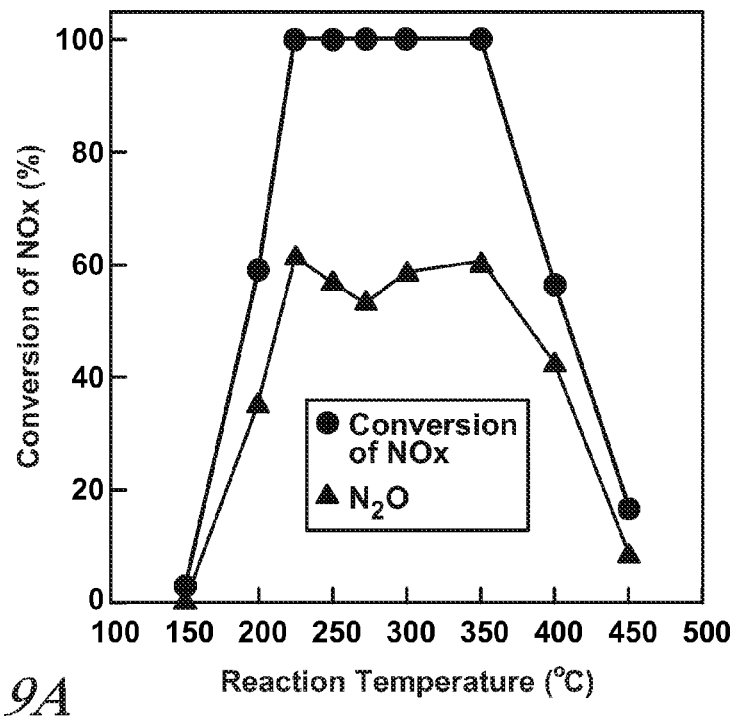
FIG. 9A is a graph of percent conversion of NOx over an Ag/alumina catalyst versus reaction temperature (° C.) of a feed stream of 200 ppm NO, with a $C_1$/NOx=8 (ethanol: dodecane=1.1 in $C_1$) and at a space velocity of 60,000/h. The conversion of NOx is presented in the filled circle data points and the conversion of NOx to $N_2$ is presented in the filled triangle data points.
Figure 9B:
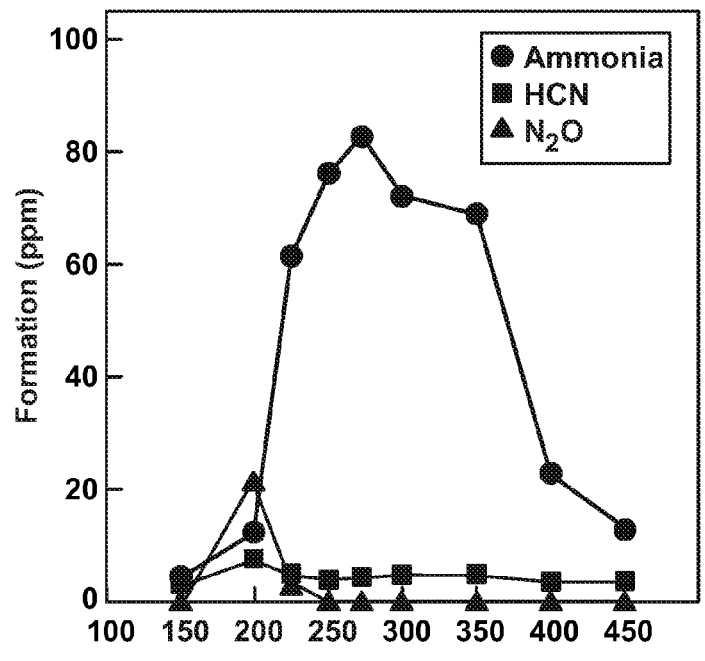
FIG. 9B is a graph of formation (ppm) of $NH_3$ (filled circles), HCN (filled triangles), and $N_2O$ (filled squares) versus reaction temperature (° C.) of the feed stream and catalyst of FIG. 9A.

Presented in FIG. 9 is the NOx conversion performance of the Ag/alumina catalyst along with N-containing byproducts such as $NH_3$, HCN and $N_2O$. It is noteworthy in FIG. 9A that the total NOx conversion of 100% is achieved in the catalyst temperature range between 225° C. and 350° C., even though the true NOx conversion to $N_2$ is much lower at around 60%. This difference can be explained by the large amount of $NH_3$ formation in this temperature range as shown in FIG. 9B. That is, NOx completely disappears during the HC/SCR process over Ag/alumina at 225-350° C., but produces $NH_3$ at the same time.

FIG. 10 compares the NOx reduction activity of Ag/alumina in a single-bed configuration with that of (Ag/alumina+CuCoY) in a dual-bed configuration with the Ag/alumina in the first bed and the CuCoY in the second bed, while keeping the overall gas space velocity the same for both configurations. FIG. 10 clearly demonstrates that the CuCoY catalyst in the rear bed enhances the overall NOx reduction activity of the system by 20-30% over 250-350° C., which can be explained by the superior activity of CuCoY for $NH_3$ oxidation to make $N_2$ compared to Ag/alumina.

It is important to note that the bimetallic catalyst (CuCoY) disclosed in this invention can be used alone to replace CuY (as shown in FIG. 2) or in combination with other HC/SCR catalysts such as Ag/alumina (as shown in FIG. 10) in order to improve the NOx reduction activity of the HC/SCR catalysts.

The practice of this selective reduction process for NOx content of a lean engine exhaust may be conducted by adding a suitable quantity of an oxidant, such as ozone, to the hot exhaust for oxidation of a desired portion of its NO content to $NO_2$. The practice of this selective reduction process may also be conducted by adding suitable relatively low molecular weight, gaseous or volatile hydrocarbons (e.g., $C_2$ to about $C_{14}$) and/or suitable oxygenated hydrocarbons (e.g., formaldehyde, ethanol, and acetaldehyde) to the exhaust stream as reductants for $NO_2$. And the reductants may be added in amounts providing, for example, a suitable ratio of carbon to nitrogen for reduction of the nitrogen-containing species of the exhaust. In illustrative embodiments of the specification, the carbon-to-nitrogen mole ratio was about eight.

In some embodiments of the invention, it may be desired to use a non-thermal hyperplasma reactor for generating ozone in a stream of air and for reforming fractionated diesel fuel in a stream of air. An example of such a non-thermal plasma reactor is illustrated in FIG. 3 of each of U.S. Pat. Nos. 6,957,528, 7,093,429, and U.S. Patent Application Publication 2006/0283175, and the related text in the specifications of these documents. Such a reactor may be sized and electrically powered for producing a suitable quantity of ozone and/or of fractionated or reformed diesel fuel for an exhaust stream. A plasma reactor may be located, for example, in or near the engine compartment of a vehicle and a stream of ambient air may be supplied by a suitable blower to the plasma reactor. The ozone-containing outlet stream from the plasma reactor may be apportioned for direct addition of ozone to the exhaust and for bubbling through a vessel containing a volume of diesel fuel for fractionating lower molecular weight hydrocarbons from the fuel volume and for reforming some of the hydrocarbon(s) to oxygenated hydrocarbons. These drawing figures and related text from these patents are incorporated herein by reference for their disclosures and use of a non-thermal hyperplasma reactor.

In general, such a nonthermal plasma reactor comprises a cylindrical tubular dielectric body suitably made of a ceramic material. The reactor has two electrodes, a high voltage electrode and a ground electrode, separated by the tubular dielectric body and an air gap. The high voltage electrode is a straight rod placed along the central longitudinal axis of the tube. The ground electrode is a conducting wire wound around the tubular dielectric body in a helical pattern. The helical ground electrode in combination with the axial high voltage electrode provides intertwined helical regions of active and passive electric fields along the length (longitudinal axis) of the reactor. The helical active electric field around the ground electrode is highly focused for effective plasma generation for ozone formation from molecular oxygen. The reactor is effectively a hyperplasma generator for purposes of the practice of this invention.

A high voltage, high frequency electrical potential is applied to the end leads to the center electrode. The helical outer ground electrode is grounded. In the operation of the nonthermal hyperplasma reactor an air stream (which may include re-circulated exhaust gas) flows through the inlet of reactor around the center electrode and within the dielectric tube and out of the exit end. The electrical potential applied to the center electrode generates the above described active and passive electric fields within the reactor. These intertwined high potential, high frequency fields are very effective in generating reactive ozone and oxygen atoms, radicals, and ion containing species within the flowing air stream in the air gap. This ozone-containing air stream leaves the nonthermal plasma reactor for addition to the exhaust stream and, optionally, for treatment of a volume of diesel fuel to fractionate and reform it.

Practices of the invention have been illustrated by some specific examples and embodiments which are presented to illustrate the invention and not to limit its scope. Clearly, many other embodiments of the invention may be devised by one skilled in the art.

The invention claimed is:

1. A method of reducing nitrogen oxides in an exhaust stream from an engine operating in a lean burn mode, the exhaust stream comprising NO and $NO_2$, oxygen, water, and nitrogen; the method comprising:

adding an oxidant to the exhaust stream for the oxidation of NO to $NO_2$;

adding a hydrocarbon or oxygenated hydrocarbon reductant to the exhaust stream for reduction of $NO_2$; and thereafter passing the exhaust stream into contact with a bi-metallic catalyst comprising particles of Y-type zeolite that are ion-substituted by an ion-exchange process using only copper and cobalt ions for said ion-substitution to form said bi-metallic catalyst.

2. A method of reducing nitrogen oxides in an exhaust stream as recited in claim 1 in which the Y-type zeolite catalyst particles are ion-substituted with the copper and cobalt ions to provide the Y-type zeolite with, by weight, about three to about six percent copper and about one and one-half percent to about three percent cobalt.

3. A method of reducing nitrogen oxides in an exhaust stream as recited in claim 1 in which the exhaust stream is passed over a first catalyst bed comprising BaY and then over a second catalyst bed comprising the particles of Y-type zeolite that are ion-substituted with copper and cobalt ions.

4. A method of reducing nitrogen oxides in an exhaust stream as recited in claim 1 in which the oxidant is formed by passing ambient air through a non-thermal plasma reactor to produce an oxidation stream comprising ozone and oxygen and at least a portion of the oxidation stream is added to the exhaust stream from the engine.

5. A method of reducing nitrogen oxides in an exhaust stream as recited in claim 1 in which the reductant is formed by passing ambient air through a non-thermal plasma reactor to produce an oxidation stream comprising ozone and oxygen and at least a portion of the oxidation stream is passed through a volume of diesel fuel to carry from the volume of diesel fuel a stream comprising hydrocarbon molecules and molecules of oxygenated hydrocarbons, the oxygenated hydrocarbons consisting of hydrogen, carbon, and oxygen atoms.

6. A method of reducing nitrogen oxides in an exhaust stream from a diesel engine, the diesel exhaust stream comprising NO and $NO_2$, oxygen, water, and nitrogen; the method comprising:

adding an oxidant to the exhaust stream for the oxidation of NO to $NO_2$;

adding a hydrocarbon or oxygenated hydrocarbon reductant to the exhaust stream for reduction of $NO_2$; and thereafter passing the exhaust stream into contact with a catalyst comprising particles of Y-type zeolite that are ion-substituted are ion-substituted by an ion-exchange process using only copper and cobalt ions for said ion-substitution to form said bi-metallic catalyst.

7. A method of reducing nitrogen oxides in a diesel exhaust stream as recited in claim 6 in which the Y-type zeolite catalyst particles are ion-substituted with the copper and cobalt ions to provide the Y-type zeolite with, by weight, about three to about six percent copper and about one and one-half percent to about three percent cobalt.

8. A method of reducing nitrogen oxides in a diesel exhaust stream as recited in claim 6 in which the exhaust stream is passed over a first catalyst bed comprising BaY and then over a second catalyst bed comprising the particles of Y-type zeolite that are ion-substituted with said copper and cobalt ions.

9. A method of reducing nitrogen oxides in a diesel exhaust stream as recited in claim 6 in which the oxidant is formed by passing ambient air through a non-thermal plasma reactor to produce an oxidation stream comprising ozone and oxygen and at least a portion of the oxidation stream is added to the exhaust stream from the diesel engine.

10. A method of reducing nitrogen oxides in a diesel exhaust stream as recited in claim 6 in which the reductant is formed by passing ambient air through a non-thermal plasma reactor to produce an oxidation stream comprising ozone and oxygen and at least a portion of the oxidation stream is passed through a volume of diesel fuel to carry from the volume of diesel fuel a stream comprising hydrocarbon molecules and molecules of oxygenated hydrocarbons consisting of hydrogen, carbon, and oxygen atoms.

11. A method of reducing nitrogen oxides in an exhaust stream as recited in claim 1 in which the exhaust stream is passed over a first catalyst bed comprising a silver/alumina catalyst and then over a second catalyst bed comprising the particles of Y-type zeolite that are ion-substituted with said copper and cobalt ions.

12. A method of reducing nitrogen oxides in a diesel exhaust stream as recited in claim 6 in which the exhaust stream is passed over a first catalyst bed comprising a silver/alumina catalyst and then over a second catalyst bed comprising the particles of Y-type zeolite that are ion-substituted with copper and cobalt ions.

13. A method comprising:
adding an oxidant to an exhaust stream of an engine, the exhaust stream comprising NO, $NO_2$, oxygen, water, and nitrogen;
adding a reductant to the exhaust stream; and
contacting the exhaust stream with a bimetallic catalyst comprising Y-type zeolite particles that are ion-substituted by an ion-exchange process using only copper and cobalt ions for said ion-substitution to form said bimetallic catalyst with about three to about six weight percent copper ions and about one and one-half to about three weight percent cobalt ions, and wherein the copper ions are ion-substituted into the Y-type zeolite before the cobalt ions.

14. A method as recited in claim 13 in which the oxidant comprises ozone.

15. A method as recited in claim 13 in which the reductant comprises a hydrocarbon or oxygenated hydrocarbon.

16. A method as recited in claim 14 further comprising passing ambient air through a non-thermal plasma reactor to produce the ozone.

17. A method as recited in claim 13 further comprising discharging the catalyzed exhaust stream to the atmosphere.

18. A method as recited in claim 13 further comprising:
passing the exhaust stream over an upstream catalyst bed comprising a silver/alumina catalyst or BaY; and
subsequently passing the exhaust stream over a downstream catalyst bed comprising the bimetallic catalyst.

* * * * *